United States Patent Office 3,499,702
Patented Mar. 10, 1970

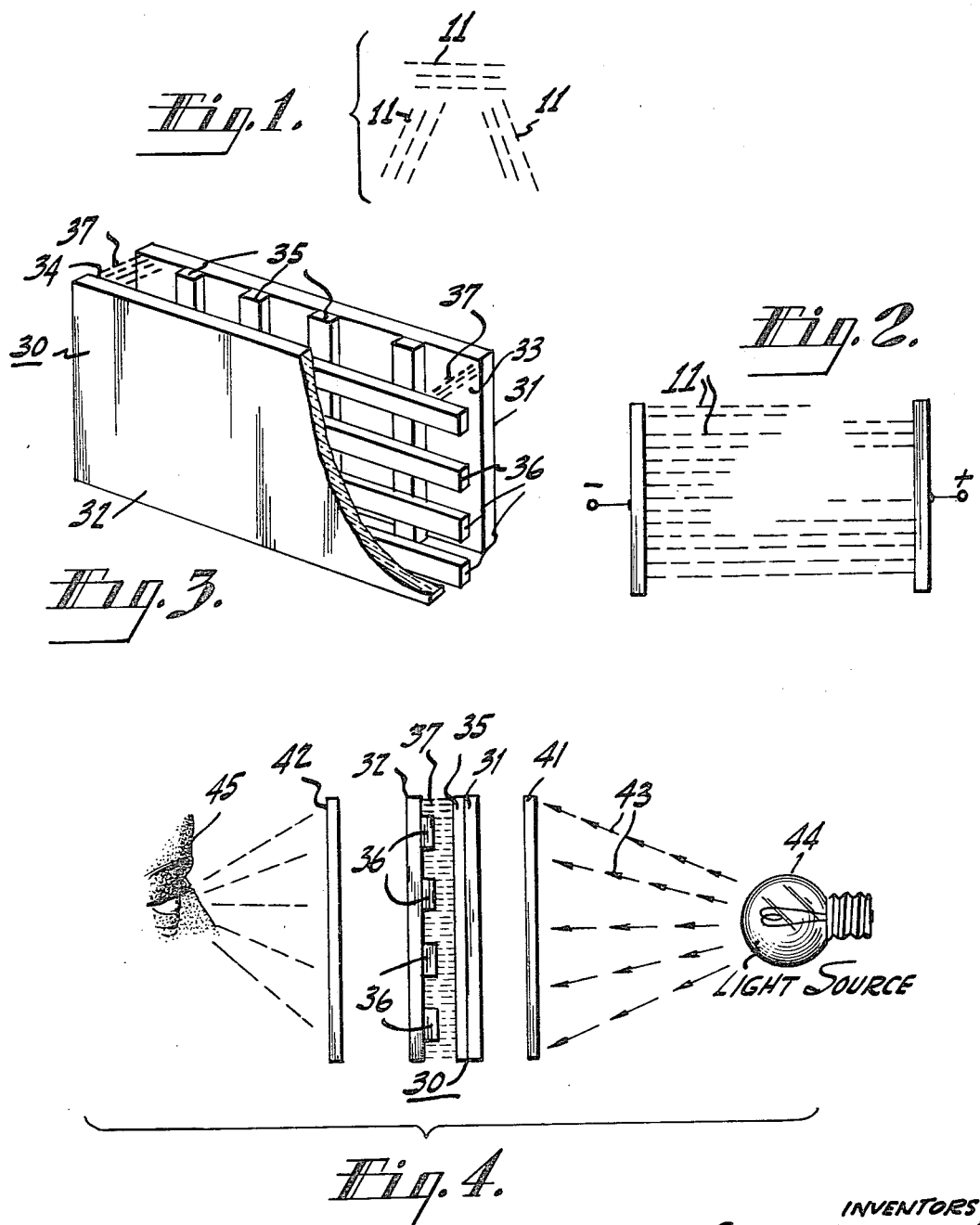

3,499,702
NEMATIC LIQUID CRYSTAL MIXTURES FOR USE IN A LIGHT VALVE
Joel E. Goldmacher, Cranbury, N.J., and George H. Heilmeier, Philadelphia, Pa., assignors to RCA Corporation, a corporation of Delaware
Filed Dec. 5, 1967, Ser. No. 688,122
Int. Cl. G02f *1/26, 1/28, 1/36*
U.S. Cl. 350—150      8 Claims

ABSTRACT OF THE DISCLOSURE

An electro-optic light valve comprises a nematic liquid crystal composition comprised of a mixture of p-n-ethoxybenzylidene-p'-aminobenzonitrile with p-n-butoxybenzylidene-p'-aminobenzonitrile and/or p-n-octoxybenzylidene-p'-aminobenzonitrile, means for applying an electric field thereto, and cross polarizing means.

BACKGROUND OF THE INVENTION

Nematic liquid crystal light valves and display devices, and nematic liquid crystal compounds useful therein are described in U.S. Patent 3,322,485, issued to Richard Williams. Such light valves are controlled by an electric field and operate when the liquid crystal material is in its mesomorphis state. Generally, with no electric field applied to the nematic liquid crystal material as disclosed in Williams, the device containing a thin layer of this material is relatively transparent to light. When an electric field is applied to the liquid crystal material above a threshold value, which value depends upon the particular liquid crystal composition, the device appears to darken in the region of the field. This darkening is due to the scattering of light by domains of the liquid crystal molecules which align themselves in the field. In the liquid crystals described there in the change in optical properties is believed to be due to the alignment of domains or swarms of birefringent liquid crystal molecules in the electric field.

The electro-optical effect due to alignment of domains of the nematic liquid crystal molecules in an electric field may be employed in transmissive, reflective, or absorptive type flat panel displays, in light shutters and other applications. Prior art liquid crystals of this type have relatively high crystal-nematic transition temperatures. That is, the temperature at which the material enters its nematic mesomorphic state is relatively high. Since the nematic liquid crystal composition must be operated while in its nematic mesomorphic state, it is therefore desirable to use compositions which have a low crystal-nematic transition temperature. It is also desirable to use materials that are highly polar so that the time required to align the domains in an electric field will be relatively short.

SUMMARY OF THE INVENTION

An electro-optical light valve comprises a nematic liquid crystal composition comprised of a mixture of p-n-ethoxybenzylidene-p'-aminobenzonitrile with at least one member of the group consisting of at least p-n-butoxybenzylidene-p'-aminobenzonitrile and p-n-octoxybenzylidene - p' - aminobenzonitrile. The light valve includes means for applying an electric field to the liquid crystal composition.

BRIEF DESCRIPTION OF THE DRAWINGS

FIGURE 1 is a schematic showing of nematic liquid crystal in its normal state without an electric field applied thereto.

FIGURE 2 is a schematic showing of the novel nematic liquid crystal composition in its electric field induced, aligned state.

FIGURE 3 is a perspective partly cut away view of an electro-optic device embodying the invention.

FIGURE 4 is a schematic view of the electro-optic device of FIGURE 3 showing its operation between cross polarizers.

DETAILED DESCRIPTION OF THE INVENTION

In the absence of an electric field, a nematic liquid crystal composition of the type described herein is believed to have its molecules 11 arranged in small randomly oriented domains, as shown in FIGURE 1, when in its mesomorphis state. Upon the application of a sufficiently high electric field to the liquid crystal composition it is believed that the domains tend to align themselves, as shown in FIGURE 2, so that a substantial proportion of the domains and hence a substantial proportion of liquid crystal molecules are aligned essentially parallel to the direction of the applied field. The degree of alignment is a function of the strength of the field.

In practice, the liquid crystal display includes two planar elements with a thin liquid crystal film between them. One of the elements is transparent while the other may be transparent, reflective or absorptive depending upon the desired mode of operation of the device. Row conductors and column conductors, which may be transparent conductors may be applied to a surface of each of the planar elements for applying an electric field to selected areas of the liquid crystal film. All of this is discussed and shown in the Williams patent. One specific embodiment of this type of light valve is shown with reference to FIGURE 3. The novel device 30 consists of back and front transparent support plates 31 and 32, respectively. The support plates 31 and 32 are parallel and are spaced apart by a distance of about one-half mil. On the inner face 33 of the back plate 31 is an array of parallel spaced transparent conductive back electrode strips 35. On the inner surface 34 of the front plate 32 is an array of parallel, spaced transparent conductive strips 36. The conductive strips 35 are mutually perpendicular to the strips 36.

In the novel device the space between the front and back plates 31 and 32 is filled with a liquid crystal mixture 37 comprising equal weight proportions of p-n-ethoxybenzylidene-p'-aminobenzonitrile and p-n-butoxybenzylidene-p'-aminobenzonitrile. The mixture may be sealed in the device 30 by using an epoxy cement around the edges of the device. In operation in the transmissive mode a light source is on the same side as the front face of the device 30 and the observer is on the same side as the back face of the device 30. With no field applied to the device 30, the device 30 appears uniformly bright to the observer. When a D.C. or A.C. field of, for example, about 10 volts is applied to any portion of the liquid crystal composition, that portion appears relatively brighter than the remainder of the device. This more is preferred because o fthe higher contrast ratios obtained as compared to other modes. When the device is operated in a reflective or absorptive mode both light source and observer are on the same side as the front plate 32 of the device 30 and the back plate is made reflective or absorbing respectively.

In order to increase the contrast ratio in the preferred transmissive mode of the device 30, it is preferred to use the device 30 between cross polarizers 41 and 42, as shown in FIGURE 4. When used in this manner, the device takes advantage of the birefringent properties of the nematic liquid crystal composition which causes rotation of the plane of polarization of polarized light incident thereon. In operation light 43 from a light source 44 is polarized when passed through the first polarizer 41. The polarized light is transmitted through the device 30 and when no field is applied to the device 30 a substantial portion of this light passes through the second polarizer 42. Hence with no field applied, the device appears uniformly bright to an observer 45. This is due to the random orientation of the domains which causes rotation of some of the polarized light which rotated light is then able to pass through the second polarizer 42. When an electric field is applied across the device 30, the domains of the novel liquid crystal composition align such that the liquid crystal molecules are parallel to the direction of the incident light. When this occurs, the plane of polarization is not rotated and hence the second polarizer 42 which is crossed with relation to the first polarizer 41 impedes the passage of light therethrough and the device in the region of the applied field appears dark to the observer 45. When the device 30 is operated in combination with cross polarizers, contrast ratios of about 10 to 1 have been observed. A gray scale is possible since the degree of domain rotation is dependent upon the field strength of the applied electric field.

Using the same principle, the device can be operated in a reflective mode with just one polarizer.

Another mode of operation of the novel device is in combination with pleochroic dyes. In this configuration a pleochroic dye is mixed with the nematic liquid crystal composition and rotation and alignment of the liquid crystal molecules causes rotation and alignment of the dye molecules. This effect thereby changes the absorption characteristics of the device when viewed in the transmission mode with polarized light. An example of a useful dye material is methyl red.

The liquid crystal compounds useful in the disclosed device are p-n-ethoxybenzylidene-p'-aminobenzonitrile; p-n-butoxybenzylidene-p'-aminobenzonitrile; and p-n-octoxybenzylidene-p'-aminobenzonitrile. Although these materials can be used separately, it is preferred to use mixtures of p-n-ethoxybenzylidene-p'-aminobenzonitrile with either p-n-butoxybenzylidene-p'-aminobenzonitrile or p-n-octoxybenzylidene-p'-aminobenzonitrile or mixtures of all three compounds. In order to substantially lower the crystal-nematic transition temperature, mixtures of from 10 to 90 weight percent of p-n-butoxybenzylidene-p'-aminobenzonitrile with p-n-ethoxybenzylidene-p'-aminobenzonitrile or mixtures containing of from 15 to 70 weight percent of each of the three compounds are preferred. The lowest crystal-nematic transition temperatures have been found with a mixture comprised of equal weights of p-n-ethoxybenzylidene-p'-aminobenzonitrile and p-n-butoxybenzylidene-p'-aminobenzonitrile or a mixture comprised of equal weights of p-n-ethoxybenzylidene-p'-aminobenzonitrile, p-n-butoxybenzylidene-p'-aminobenzonitrile, and p - n - octoxybenzylidene-p'-aminobenzonitrile. The following table shows the comparison between crystal-nematic transition temperatures and the nematic-isotropic transition temperatures of some of the particular prior art compounds and that of the p-n-alkoxybenzylidene-p'-aminobenzonitrile compounds and the novel mixtures thereof.

Threshold voltages for a one-half mil thick cell containing the novel mixtures are approximately 10 volts A.C. or D.C. Switching time for switching of a one-half mil cell at 100 volts D.C. is in the order of 10 milliseconds for the rise time and about 30 to 100 milliseconds for the decay time. By rise time, it is meant the time necessary to align the domains. By decay time, it is meant the time it takes after the removal of the applied field for the liquid crystals to return to its random state.

The novel mixtures are comprised of anils having the structural formula

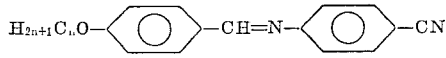

Generally, these materials can be prepared by the condensation of p-aminobenzonitrile with the appropriate p-alkoxybenzaldehyde in a refluxing benzene solution with benzenesulfonic acid as a catalyst and azeotropic removal of water. Purification of the compound is generally accomplished by repeated recrystallization from hexane solution to a constant nematic-isotropic transition temperature.

For example, the compound p-n-ethoxybenzylidene-p'-aminobenzonitrile can be prepared in the following manner: A solution of 0.10 mole of p-aminobenzonitrile, 0.10 mole of p-ethoxybenzaldehyde, 0.1 gram of benzene sulfonic acid in 500 milliliters of benzene is refluxed for about three hours. A Dean-Stark trap is used to collect the water which is azeotropically removed. After refluxing, the solvent is removed by evaporation under reduced pressure in a rotating film evaporator. The residue is collected and recrystallized several times from hexane.

The p - n - butoxybenzylidene - p' - aminobenzonitrile compound is prepared in a similar manner except that p-butoxybenzaldehyde is used rather than the ethoxybenzaldehyde stated above. In a like manner, p-n-octoxybenzylidene-p'-aminobenzonitrile is prepared by substituting p-octoxybenzaldehyde for ethoxybenzaldehyde in the above example.

In order to prepare the novel mixtures, the pure crystalline compounds are weighted into a vial into the desired weight proportion and the mixture heated to the isotropic melting point so as to form an isotropic solution. The isotropic solution is allowed to cool to zero degree centrigrade and becomes solidified during this cooling. The resulting solid mass can be broken off into small pieces and can be placed in a capillary tube or on a glass slide for melting point determination. The mixtures may be inserted in the liquid crystal device by having the planar supporting elements either separated by means of a shim or by sealing three sides together with an epoxy cement leaving a space between the elements. The liquid crystal composition is then heated to a temperature greater than its crystal-nematic transition temperature and injected into the space between the planar elements, for example, by means of a syringe.

What is claimed is:

1. A liquid crystal light valve comprising a composition including at least one member of the group of nematic liquid crystals consisting of p-n-butoxybenzylidene - p' - aminobenzonitrile and p-n-octoxybenzylidene-

| Compositon | Crystal-Nematic Transition Temperature (° C.) | Nematic-Isotropic Transition Temperature (° C.) |
| --- | --- | --- |
| p-Azoxyanisole | 116 | 135 |
| 4,4'-diethoxyazoxybenzene | 137 | 167 |
| 4,4'-di-n-pentoxy-azoxybenzene | 79 | 121 |
| p-n-Ethoxybenzylidene-p'-aminobenzonitrile | 105 | 130 |
| p-n-Butoxybenzylidene-p'-aminobenzonitrile | 63 | 106 |
| p-n-Octoxybenzylidene-p'-aminobenzonitrile | 79 | 94.5 |
| p-n-Ethoxybenzylidene-p'-aminobenzonitrile and p-n-butoxybenzylidene-p'-aminobenzonitrile (equal weights) | 41 | 109 |
| p-n-Ethoxybenzylidene-p'-aminobenzonitrile p-n-Butoxybenzylidene-p'-aminobenzonitrile p-n-Octoxybenzylidene-p'-aminobenzonitrile (equal weights) | 50 | 91 | p'-aminobenzonitrile, and means for applying an electric field to said composition.

2. A liquid crystal light valve comprising:
   (a) a mixture of nematic liquid crystals of the type that rotate and align upon the application of an electric field thereto, said mixture consisting essentially of p-n-ethoxybenzylidene-p'-aminobenzonitrile with at least one member of the group consisting of p-n-butoxybenzylidene-p'-aminobenzonitrile and p-n-octoxybenzylidene-p'-aminobenzonitrile, and
   (b) means for applying an electric field thereto.

3. A liquid crystal light valve of the type described in claim 2 wherein said mixture of nematic liquid crystals consists essentially of 10 to 90 weight percent of p-n-ethoxybenzylidene - p' - aminobenzonitrile with from 90–10 weight percent of p-n-butoxybenzylidene-p'-aminobenzonitrile.

4. The liquid crystal light valve described in claim 3 wherein said mixture of nematic liquid crystals consists essentially of about 50 weight percent of each component and wherein said device includes crossed polarizers between which said liquid crystal mixture is disposed.

5. A liquid crystal light valve of the type described in claim 2, wherein the nematic liquid crystal mixture is comprised of from 15 to 70 weight percent of p-n-ethoxybenzylidene - p' - aminobenzonitrile, from 15 to 17 weight percent of p - n - butoxybenzylidene - p' - aminobenzonitrile, and from 15 to 70 weight percent of p-n-octoxybenzylidene-p'-aminobenzonitrile.

6. The liquid crystal light valve described in claim 5 wherein the nematic liquid crystal mixture is comprised of approximately equal weights of each component, said mixture located between crossed polarizers.

7. A liquid crystal light valve comprising:
   (a) a mixture of nematic liquid crystal in the form of a thin layer, said mixture consisting essentially of
       p - n - ethoxybenzylidene - p' - aminobenzonitrile;
       p - n - butoxybenzylidene - p' - aminobenzonitrile;
       and p - n - octoxybenzylidene - p' - aminobenzonitrile and said mixture being dispuosed between crossed polarizers, and
   (b) means for applying an electric field to said mixture.

8. The liquid crystal light valve described in claim 7, said light valve including a pleochroic dye in solution with said nematic liquid crystal mixture.

References Cited

UNITED STATES PATENTS 3,322,485    5/1967    Williams.

JEWELL H. PEDERSON, Primary Examiner

E. BAUER, Assistant Examiner

U.S. Cl. X.R.

23—230; 260—465; 350—160